(12) United States Patent
Kameyama

(10) Patent No.: US 8,810,685 B2
(45) Date of Patent: Aug. 19, 2014

(54) IMAGINE APPARATUS, INFORMATION PROCESSING APPARATUS, IMAGING SYSTEM AND METHODS THEREOF FOR MANAGEMENT OF IMAGE DATA

(75) Inventor: Takaki Kameyama, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/366,175

(22) Filed: Feb. 3, 2012

(65) Prior Publication Data

US 2012/0200739 A1    Aug. 9, 2012

(30) Foreign Application Priority Data

Feb. 8, 2011   (JP) .................................. 2011-025002

(51) Int. Cl.
*H04N 5/76* (2006.01)
*H04N 7/18* (2006.01)
*H04N 5/77* (2006.01)
*H04N 9/82* (2006.01)

(52) U.S. Cl.
CPC .............. *H04N 5/772* (2013.01); *H04N 9/8205* (2013.01)
USPC ........................................ 348/231.3; 348/118

(58) Field of Classification Search
CPC .......... H04N 1/32128; H04N 2010/00; H04N 2201/3225; H04N 2201/3253; H04N 2201/3277; H04N 5/772; H04N 9/8205
See application file for complete search history.

(56) References Cited

U.S. PATENT DOCUMENTS

| | | | |
|---|---|---|---|
| 6,525,768 B2 * | 2/2003 | Obradovich | 348/231.99 |
| 7,046,285 B2 * | 5/2006 | Miyagi et al. | 348/333.05 |
| 7,120,313 B2 * | 10/2006 | Kotake et al. | 382/282 |
| 2010/0321406 A1 * | 12/2010 | Iwase et al. | 345/638 |

FOREIGN PATENT DOCUMENTS

| | | |
|---|---|---|
| JP | 2001-91290 A | 4/2001 |
| JP | 2006-80843 A | 3/2006 |

* cited by examiner

*Primary Examiner* — Twyler Haskins
*Assistant Examiner* — Padma Haliyur
(74) *Attorney, Agent, or Firm* — Canon U.S.A., Inc. IP Division

(57) ABSTRACT

An imaging apparatus acquires position information at regular intervals and records the position information in one route log file, and in a case that imaging is performed, acquires position information and records the position information in correlation with image data acquired by an imaging unit, and in a case that the image data with which the position information is correlated is to be deleted, extracts the position information correlated with the image data and records the position information extracted by the extraction unit.

18 Claims, 10 Drawing Sheets

FIG.7A

IMG_0001.JPG 05:48:35 AUG 29, 2010, 140°21'53.2" E, 35°46'36.1" N
IMG_0003.JPG 10:15:31 AUG 29, 2010, 140°23'13.4" E, 35°47'04.3" N

IMAGINE APPARATUS, INFORMATION PROCESSING APPARATUS, IMAGING SYSTEM AND METHODS THEREOF FOR MANAGEMENT OF IMAGE DATA

BACKGROUND OF THE INVENTION

1. Field of the Invention

The present invention relates to an imaging apparatus, an information processing apparatus, and an imaging system. More particularly, the present invention relates to an imaging apparatus, an information processing apparatus, and an imaging system having an current-position-recording function using a global positioning system (GPS), and a storage medium.

2. Description of the Related Art

According to the widespread use of GPS, using digital cameras utilizing GPS has become popular these days. How to use such cameras is mainly as follows:

(1) Add information of the imaging position to the captured images when imaging is performed. The user can obtain the imaging position of each of the images by displaying the images on a map on a display of a camera or a computer after capturing the images.

(2) Keep recording positions regardless of whether the imaging is performed to obtain a record of route log. The user can obtain information of the route of the movement by displaying the route log on a map on a screen of a camera or a computer.

For example, Japanese Patent Application Laid-Open No. 2001-91290 discusses a technique in which in addition to a camera, an external apparatus is used for recording the route log. After an image is recorded, the imaging time is checked against the route log for recording the locations where the imaging has been performed.

Further, Japanese Patent Application Laid-Open No. 2006-80843 discusses a technique useful for recording a route log by using a cellular phone with GPS. According to this technique, the position of the cellular phone is acquired when the user of the cellular phone passes a particular location, so that the route log is interpolated. This technique is useful when the position cannot be acquired at, for example, underground shopping mall).

According to the usage described above, imaging apparatuses can be used for adding an imaging position to a captured image as well as recording a route log unrelated to the imaging. When such imaging apparatuses are operated for the purposes described above, two files, an image file including the position information and a route log file in which a locus of movement is recorded, will be generated.

However, considering the above-described imaging apparatuses, since the position information is stored in different files (the image file and the route log file), it is difficult to use the information in the imaging file together with the information in the route log file.

SUMMARY OF THE INVENTION

According to an aspect of the present invention, an imaging apparatus includes an imaging unit configured to perform imaging of an object and obtain image data, a first recording unit configured to acquire position information at regular intervals and record the position information in one route log file, a second recording unit configured to, in a case that imaging is performed by the imaging unit, acquire the position information and record the acquired position information and the image data obtained by the imaging unit in such a manner that the acquired position information is correlated with the image data, an extraction unit configured to extract the position information correlated with the image data in a case that the image data with which the position information is correlated is to be deleted, and a third recording unit configured to record the position information extracted by the extraction unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7A illustrates an example of a "position information of deleted image" file according to the first exemplary embodiment.

FIG. 7B illustrates an example of a route log file according to the first exemplary embodiment.

DESCRIPTION OF THE EMBODIMENTS

Various exemplary embodiments, features, and aspects of the invention will be described in detail below with reference to the drawings.

Figure 1:
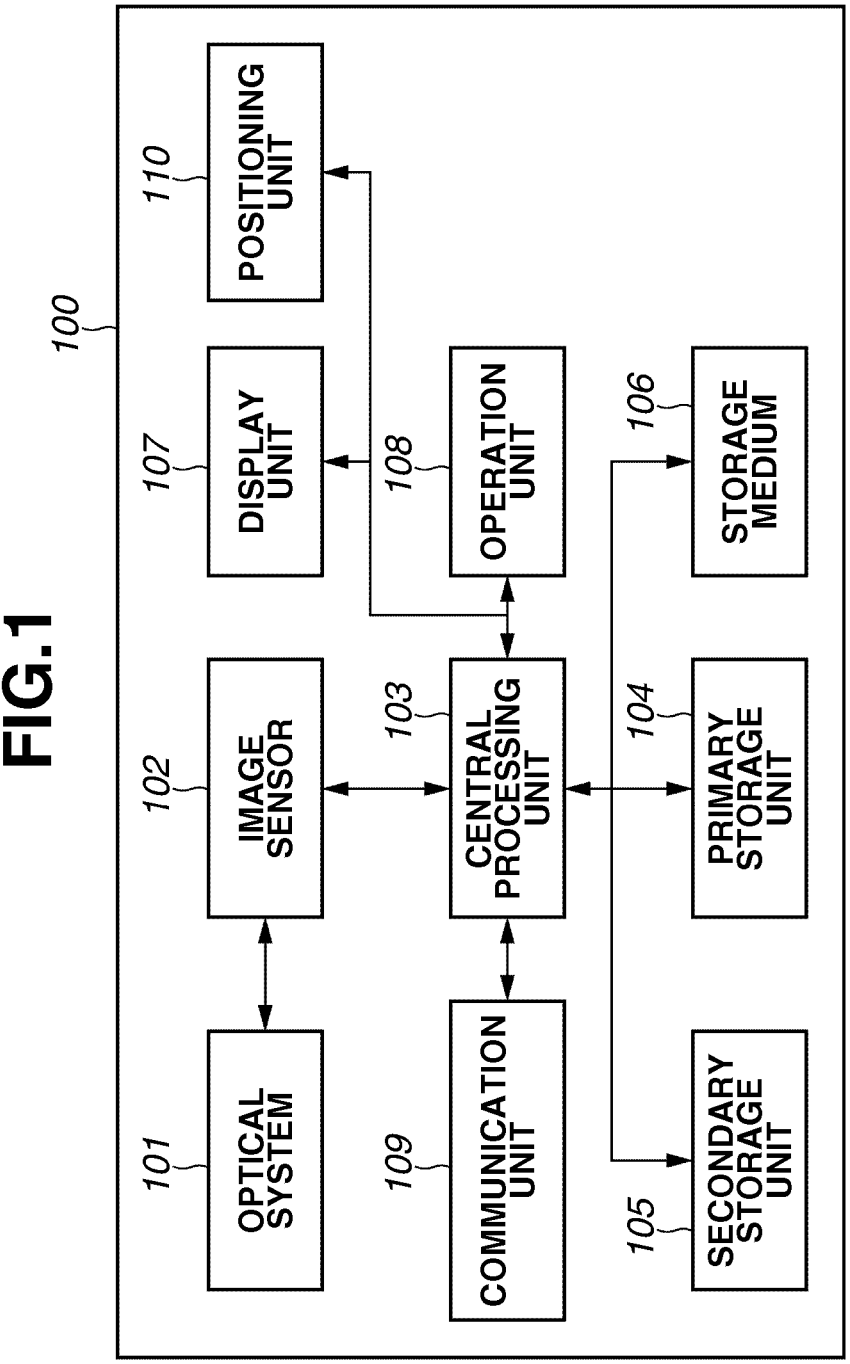
FIG. 1 is a block diagram illustrating a configuration example of an imaging apparatus according to a first exemplary embodiment of the present invention.

The first exemplary embodiment will be described. FIG. 1 is a block diagram illustrating a configuration example of an imaging apparatus 100 according to the exemplary embodiment of the present invention. The imaging apparatus 100 according to the present embodiment includes an optical system 101, an image sensor 102, a central processing unit (CPU) 103, a primary storage unit 104, a secondary storage unit 105, a storage medium 106, a display unit 107, an operating unit 108, a communication unit 109, and a positioning unit 110.

The optical system 101 includes a lens, a shutter, and a diaphragm. The optical system 101 forms an image of light from an object on the image sensor 102 with an appropriate amount of light and timing. The image sensor 102 converts the optical image formed by the light that passed through the optical system 101 into image data. The CPU 103 performs calculation and controls each component of the imaging apparatus 100.

The primary storage unit 104 stores temporary data and is used as a work area of the CPU 103. The secondary storage unit 105 stores a program (firmware) used for controlling the imaging apparatus 100 and various types of setting information. The storage medium 106 stores image data which has been acquired by imaging. When the imaging is completed, the storage medium 106 can be removed from the imaging apparatus and set to a personal computer or the like. Then, data in the storage medium 106 can be read out.

The display unit 107 displays a view finder image when the imaging is performed, displays the captured image, and also displays characters for dialog operation. The operating unit 108 accepts the operation of the user. The communication unit 109 is connected to an external apparatus to exchange control commands and data. The communication unit 109 may be either wired or wireless. Further, the communication unit 109 may be directly connected to the external apparatus or connected to the external apparatus via a network. The positioning unit 110 receives a radio wave from a satellite of a global positioning system (GPS) and acquires actual position information based on the reception result of the radio wave.

Figure 2:
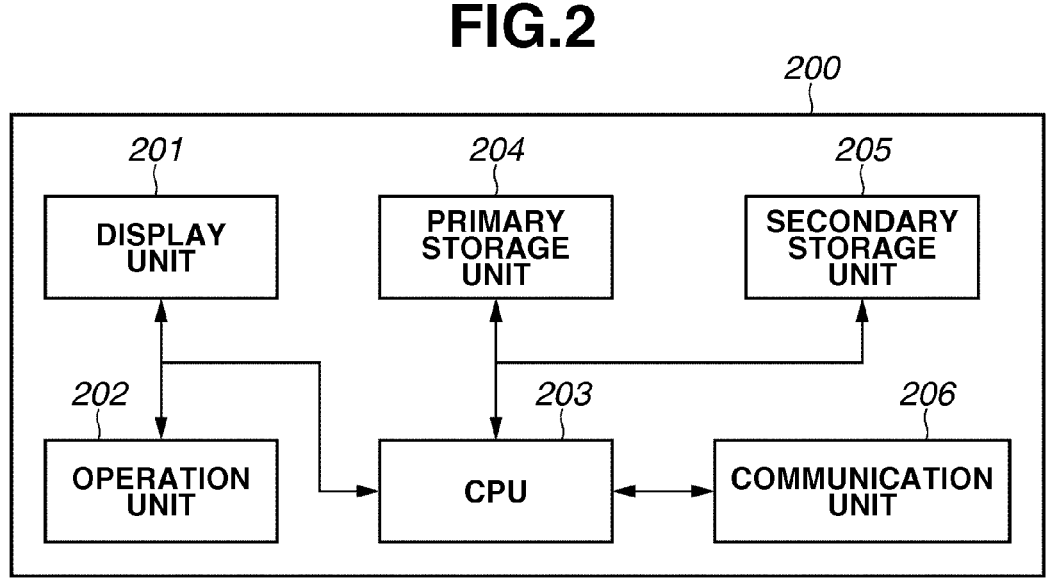
FIG. 2 is a block diagram illustrating a configuration example of an information processing apparatus according to the first exemplary embodiment.

FIG. 2 is a block diagram illustrating a configuration example of an information processing apparatus 200 according to the present exemplary embodiment. The information processing apparatus 200 according to the present exemplary embodiment includes a display unit 201, an operation unit 202, a CPU 203, a primary storage unit 204, a secondary storage unit 205, and a communication unit 206. The information processing apparatus 200 is configured to be capable of communicating with the imaging apparatus 100. The information processing apparatus 200 and the imaging apparatus 100 constitute an imaging system.

The display unit 201 displays characters and images. The operation unit 202 accepts the operation performed by the user. The CPU 203 executes various calculations and further controls each component of the information processing apparatus 200. The primary storage unit 204 stores temporary data and is used as a work area of the CPU 203. The secondary storage unit 205 stores an operating system used for controlling the information processing apparatus 200 and various application programs.

The communication unit 206 is connected to an external apparatus to exchange control commands and data. The communication unit 206 may be either wired or wireless. Further, the communication unit 206 may be directly connected to the external apparatus or connected to the apparatus via a network.

Figure 3:
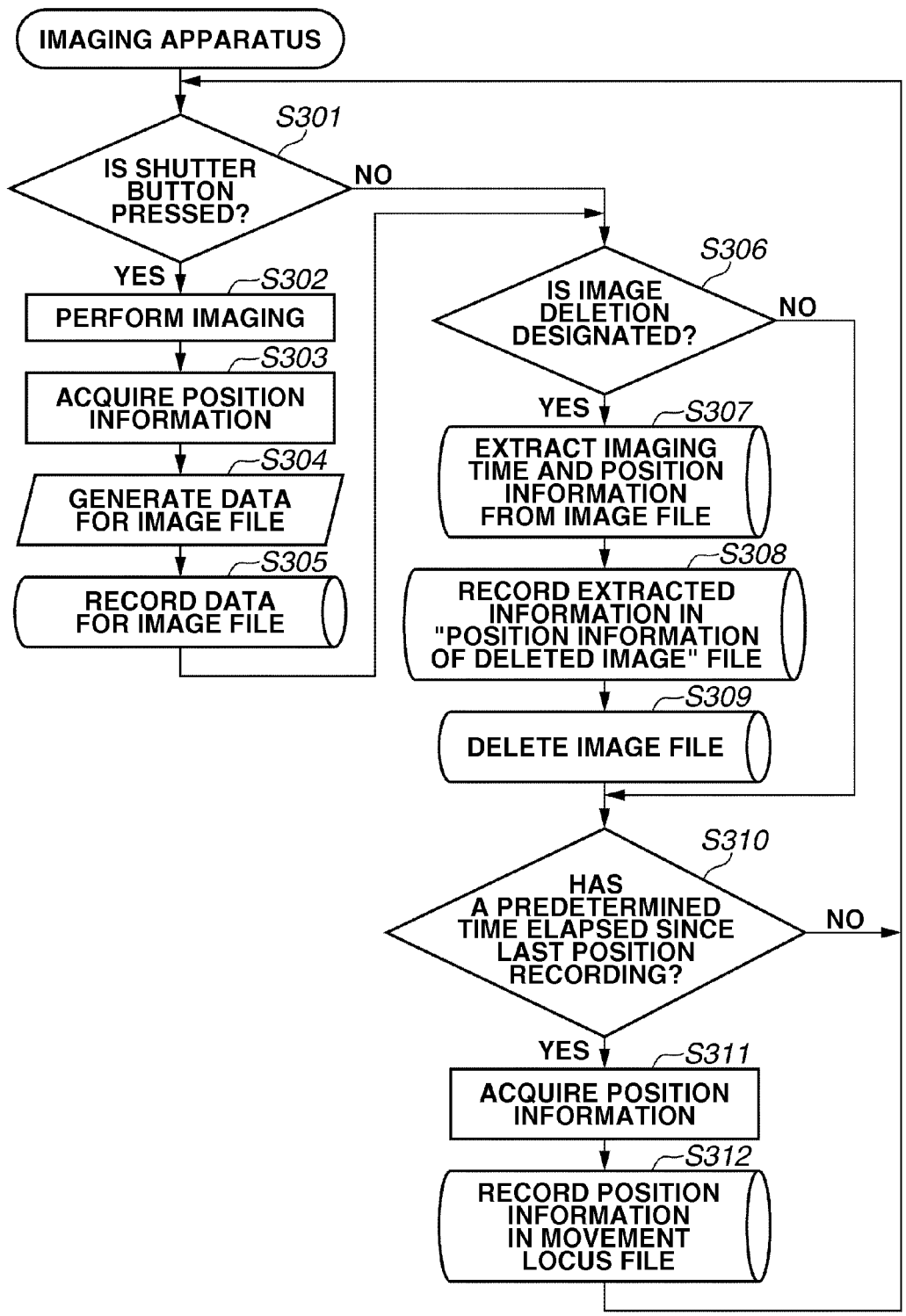
FIG. 3 is a flowchart illustrating processing procedures of the imaging apparatus according to the first exemplary embodiment.
Figure 6:
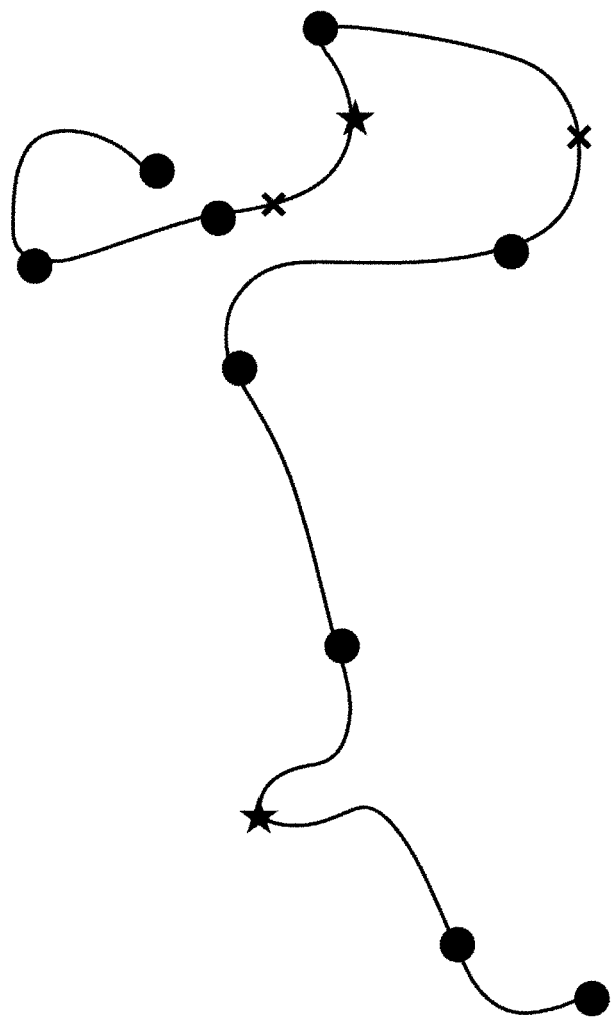
FIG. 6 illustrates an example of a route log of the imaging apparatus when the user walks around and captures images according to the first exemplary embodiment.

FIG. 3 is a flowchart illustrating the processing flow of the imaging apparatus 100 according to the present exemplary embodiment. The processing is realized by the CPU 103 reading out a program stored in the secondary storage unit 105 and executing the program. Details of this processing will be described below. Further, the processing in FIG. 3 is described based on the assumption that the user has proceeded along a route such as the one illustrated in FIG. 6 and captured images. The solid line in FIG. 6 is the route along which the user has actually proceeded. Further, the black circles on the pathway indicate the points whose position information is recorded in a route log file, the stars indicate the imaging points, and the X marks indicate the imaging points of deleted images.

In step S301, the imaging apparatus 100 determines whether a shutter button of the operating unit 108 has been pressed. If the shutter button has been pressed (YES in step S301), the processing proceeds to step S302. If the shutter button has not been pressed (NO in step S301), the processing proceeds to step S306. In step S302, the imaging apparatus 100 performs the imaging by driving the optical system 101 and the image sensor 102. In this case, the position information of the imaging is acquired and the imaging position is recorded in an image file.

In step S303, the imaging apparatus 100 drives the positioning unit 110 and acquires information of the actual position. In step S304, the CPU 103 generates data for the image file using the image data obtained in step S302, the position information obtained in step S303, and the current time (i.e., imaging time). Thus, image data, position information, and imaging time are included in the image file.

The time may be obtained from a built-in clock of the imaging apparatus 100 but can also be obtained from a radio wave received by the positioning unit 110. Further, the imaging apparatus 100 can perform the positioning at regular intervals and store the latest position information in the primary storage unit 104. In this case, the imaging apparatus 100 can include the actual position information stored in the primary storage unit 104 in the image file at the timing of step S303.

In step S305, the imaging apparatus 100 records the data for image file generated in step S304 in the storage medium 106. In step S306, the imaging apparatus 100 determines whether image deletion has been designated by the user. If image deletion has been designated (YES in step S306), the processing proceeds to step S307. If the image deletion has not been designated (NO in step S306), the processing proceeds to step S310.

In step S307, the imaging apparatus 100 extracts the imaging time and the position information from the image to be deleted. In step S308, the imaging apparatus 100 records the imaging time and the position information extracted in step S307 in a "position information of deleted image" file stored in the storage medium 106. If the "position information of deleted image" file is not recorded in the storage medium 106, a new file is generated and the extracted imaging time and position information is recorded in the generated file.

Figures 7A, 7B:
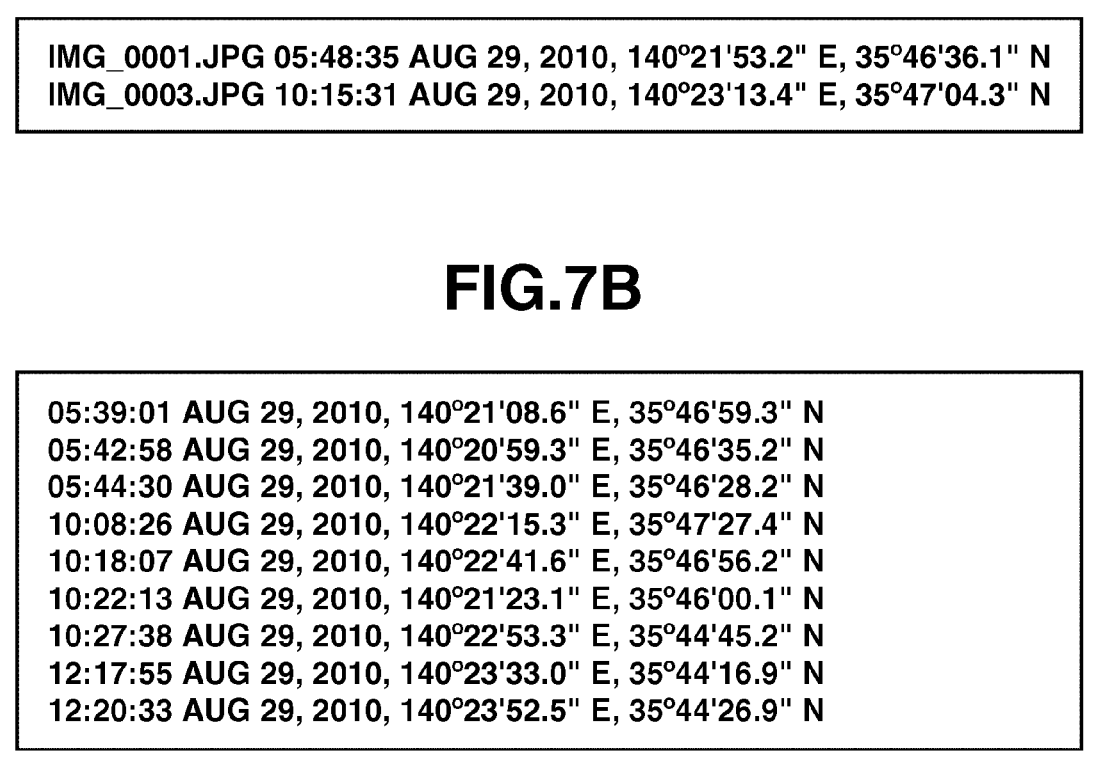

FIG. 7A illustrates an example of the "position information of deleted image" file. The position information indicated in this file corresponds to the position of the X marks in FIG. 6. The "position information of deleted image" file is used for interpolating the locus described below. The format of the data structure of the "position information of deleted image" file is not limited so long as the file is recorded in a manner such that the correlation between the time the image has been captured and the position information can be referred to.

In step S309, the imaging apparatus 100 deletes the image file whose deletion has been designated in step S306. In step S310, to acquire the position information at regular intervals, the imaging apparatus 100 determines whether a predetermined time has elapsed since the last recording of the position information using the records of the position information acquired and recorded in steps S311 and S312. If a predetermined time has elapsed since the last recording (YES in step S310), the processing proceeds to step S311. Further, if this recording is the first recording of the position information, the processing also proceeds to step S311. On the other hand, if a predetermined time has not yet elapsed since the last recording (NO in step S310), the processing returns to step S301.

In step S311, the imaging apparatus 100 drives the positioning unit 110 and acquires information of the current position. In step S312, the imaging apparatus 100 performs recording of the route log, in which the imaging apparatus records the position information, which has been acquired in step S311, and the current time in a route log file stored in the storage medium 106. This recording is additional writing. In other words, by repetitive additional writing of the position and time in the route log file, a track record can be obtained.

FIG. 7B illustrates an example of the route log file. The position information presented in this file corresponds to the positions of the circles in FIG. 6. The format of the data structure of the route log file is not limited so long as the correlation between the position and the time can be referenced to at each time point.

Figure 4:
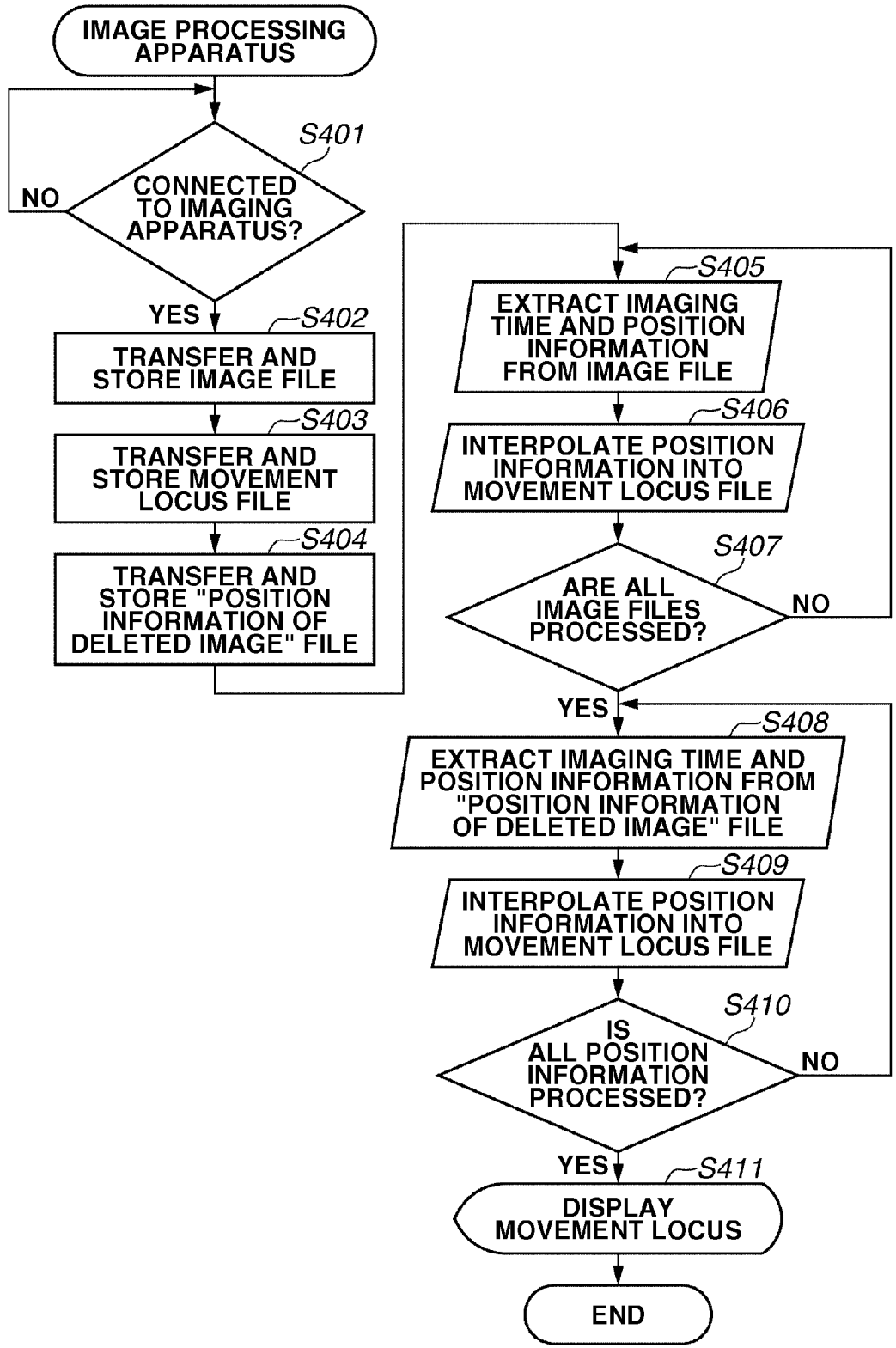
FIG. 4 is a flowchart illustrating processing procedures of the information processing apparatus according to the first exemplary embodiment.

FIG. 4 is a flowchart illustrating processing of the information processing apparatus 200 according to the present exemplary embodiment. This processing is realized by the CPU 203 reading out and executing a program recorded in the secondary storage unit 205. In step S401, the information processing apparatus 200 monitors whether the information processing apparatus 200 is connected to the imaging apparatus 100 via the communication unit 206 and the communication unit 109. If the information processing apparatus 200 is connected to the imaging apparatus 100 (YES in step S401), the processing proceeds to step S402. If not (NO in step S401), step S401 is repeated.

In step S402, the CPU 203 transfers the image file stored in the imaging apparatus 100 to the information processing apparatus 200. The information processing apparatus 200 receives the image file, and then the CPU 203 stores it in the secondary storage unit 205. In step S403, the CPU 203 transfers a route log file stored in the imaging apparatus 100 to the information processing apparatus 200. The information processing apparatus 200 receives the route log file, and then the CPU 203 stores it in the secondary storage unit 205.

In step S404, the CPU 203 transfers the "position information of deleted image" file stored in the imaging apparatus 100 to the information processing apparatus 200. On receiving the "position information of deleted image" file, the information processing apparatus 200 stores it in the secondary storage unit 205. In step S405, the information processing apparatus 200 extracts the imaging time and position information from the image file stored in step S402.

Figure 8:
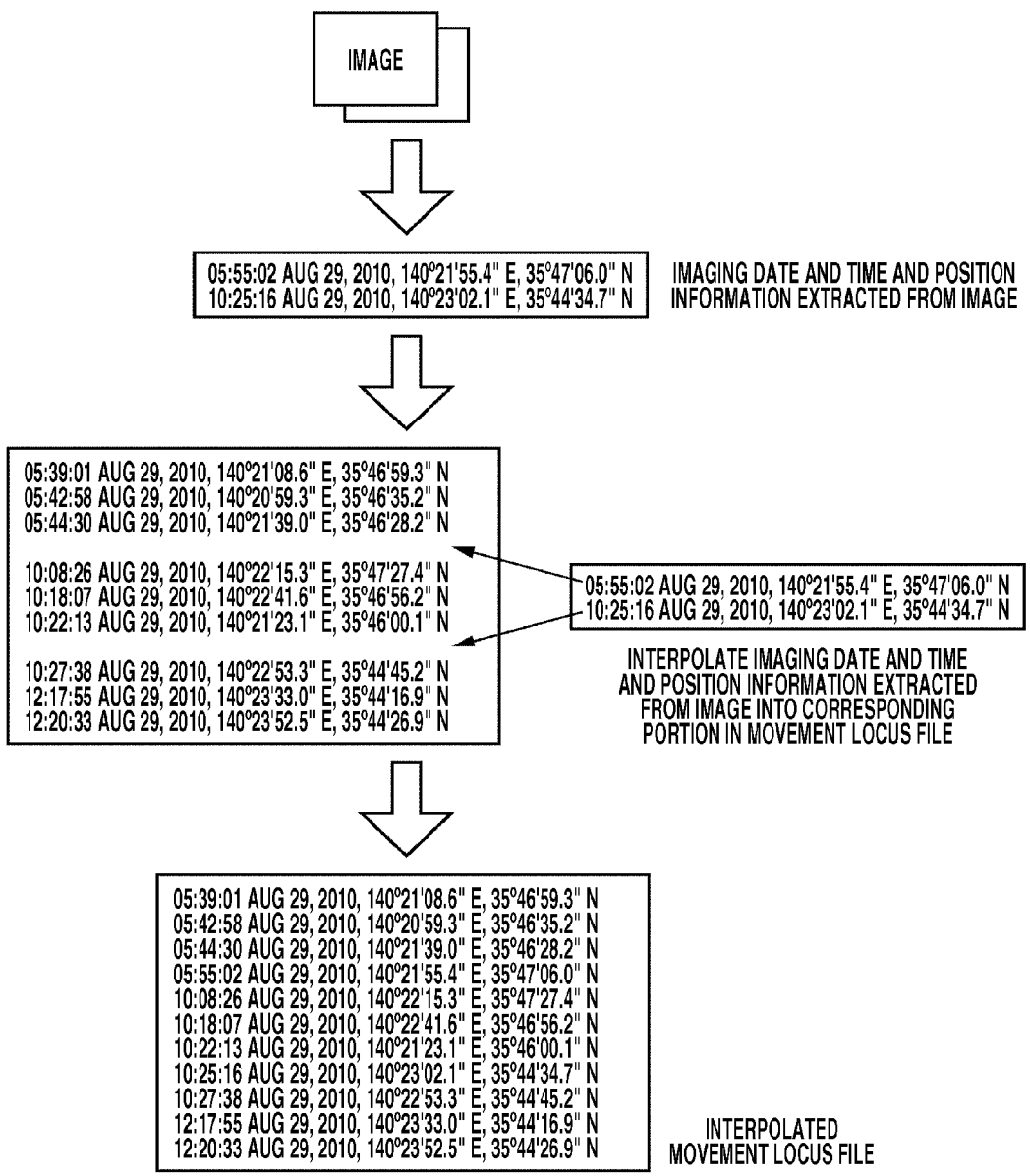
FIG. 8 illustrates an example of interpolation of route log file with information extracted from an image according to the first exemplary embodiment.

In step S406, the information processing apparatus 200 performs the route log information interpolation processing. Specifically, the information processing apparatus 200 converts the imaging time information and the position information extracted in step S405 into a format of the file data structure of the route log information and the route log file stored in step S403 is interpolated with the obtained information. According to the example in FIG. 6, the stars indicate the positions where the images have been captured and stored. FIG. 8 illustrates the route log file after the interpolation. As can be seen from FIG. 8, the route log file illustrated in FIG. 7B is interpolated with the imaging time and the position information extracted from the images. In step S407, the CPU 203 determines whether processing of all the image files has been finished. If processing of all the image files has been finished (YES in step S407), the processing proceeds to step S408. If not (NO in step S407), the processing returns to step S405.

Figure 9:
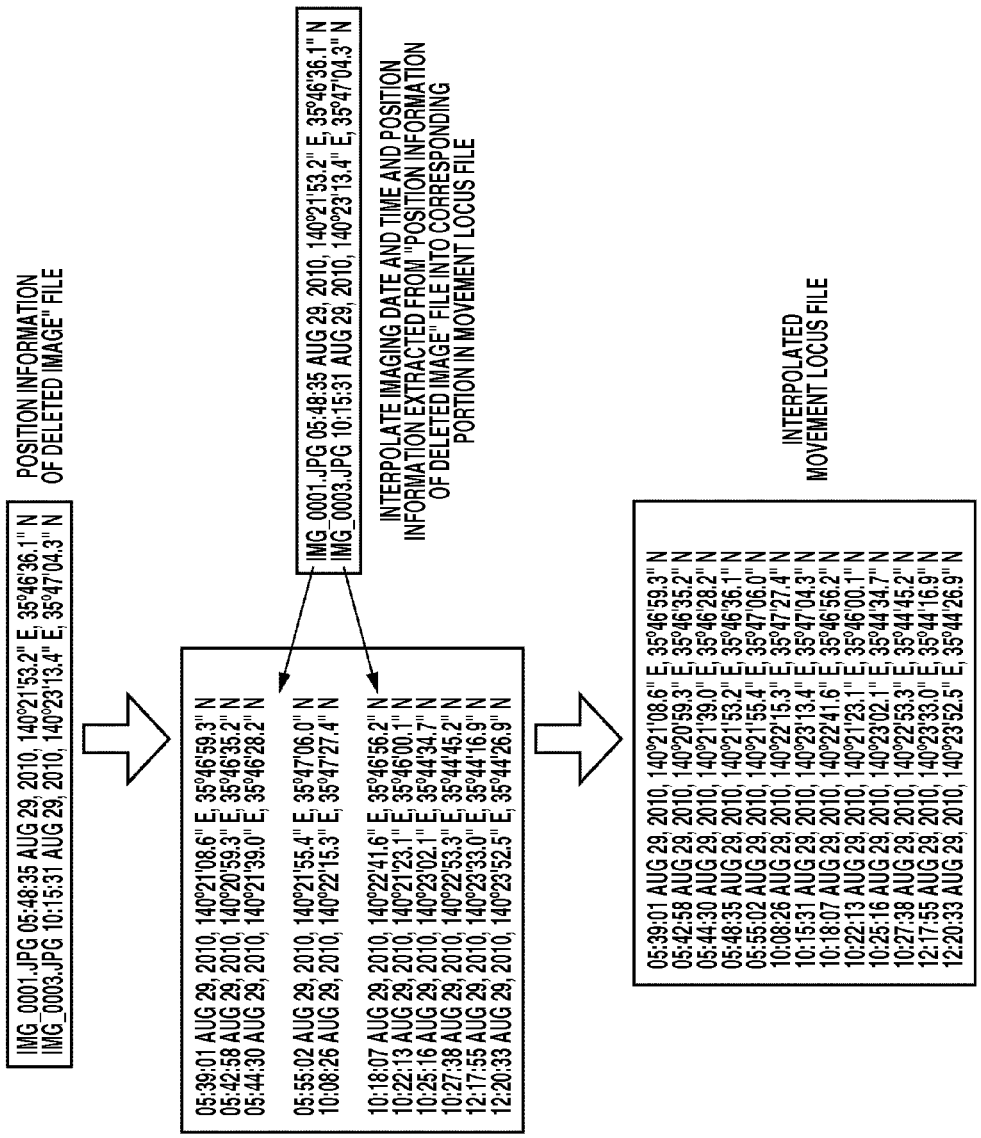
FIG. 9 illustrates an example of interpolation of the route log file with the "position information of deleted image" file according to the first exemplary embodiment.

In step S408, the information processing apparatus 200 extracts a set of imaging time and position information included in the "position information of deleted image" file stored in step S404. In step S409, the information processing apparatus 200 performs the route log information interpolation processing to interpolate the route log file stored in step S403 with the information of the imaging time and position extracted in step S408. FIG. 9 illustrates the route log file after the interpolation. As can be seen from FIG. 9, the route log file interpolated in step S406 is further interpolated with the imaging time and position in the "position information of deleted image" file in FIG. 7A.

In step S410, the information processing apparatus 200 determines whether processing of all the imaging time and position included in the "position information of deleted image" file has been processed. If processing of all the imaging time and position is finished (YES in step S410), the processing proceeds to step S411. If processing of all the imaging time and position is not yet finished (NO in step S410), the processing returns to step S408. In step S411, the information processing apparatus 200 displays the route log on the display unit 201 by using the data of the route log file whose process has performed.

By executing the processing described above, the accuracy of the route log can be improved according to the interpolation with the imaging position information recorded at the time of imaging. In other words, although the normal route log is formed by position information acquired at regular intervals, the accuracy of the route log according to the present embodiment is improved according to the addition of the imaging position information. Especially, the position where the imaging has been performed is likely to be an important position for the user. Thus, the interpolation with the imaging position is considered to be effective. Further, by recording the position information in the "position information of deleted image" file when an image is deleted, the position information of the deleted image can be effectively utilized.

Figure 10:
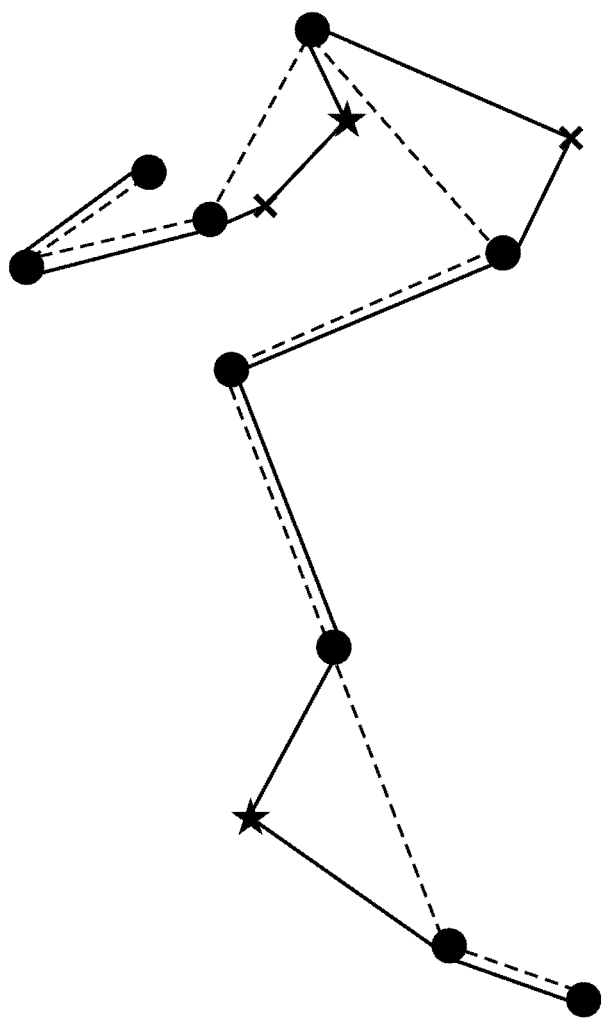
FIG. 10 illustrates an effect of the interpolation of the route log file according to the first exemplary embodiment.

FIG. 10 illustrates an example of a route log which is obtained when the user moves along the route illustrated in FIG. 6. The broken line in FIG. 10 shows the route log which is obtained when only the information of the original route log file is used. The solid line shows the route log which is obtained when the information acquired from the image file and the "position information of deleted image" file is added to the original route log file. The route log after the interpolation is closer to the actual moving route illustrated in FIG. 6.

Figure 5:
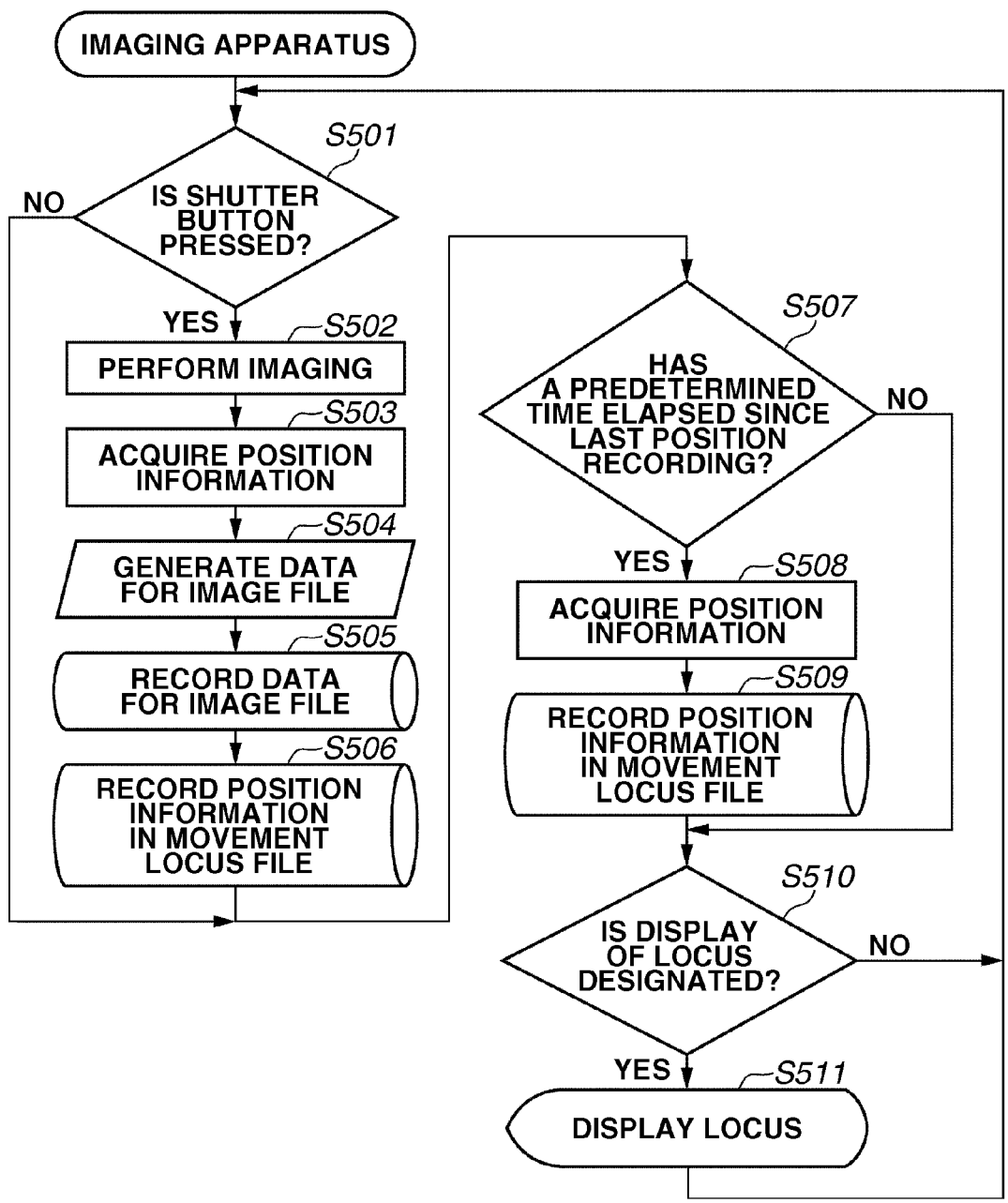
FIG. 5 is a flowchart illustrating processing procedures of the imaging apparatus according to a second exemplary embodiment of the present invention.

Next, a second exemplary embodiment of the present invention will be described. The configurations of the imaging apparatus 100 illustrated in FIG. 1 will be used for the present embodiment as is with the first exemplary embodiment. FIG. 5 is a flowchart illustrating processing of the imaging apparatus 100 according to the present exemplary embodiment. The processing is performed by the CPU 103 reading out and executing a program recorded in the secondary storage unit 105. Details of this processing will be described below.

In step S501, the imaging apparatus 100 monitors whether a shutter button of the operating unit 108 has been pressed. If the shutter button has been pressed (YES in step S501), the processing proceeds to step S502. If the shutter button has not been pressed (NO in step S501), the processing proceeds to step S507. In step S502, the imaging apparatus 100 performs the imaging by driving the optical system 101 and the image sensor 102. In step S503, the imaging apparatus 100 drives the positioning unit 110 and acquires information of the current position.

In step S504, the imaging apparatus 100 generates data to be recorded as the image file using the image data obtained in step S502, the position information obtained in step S503, and current time (i.e., imaging time). Thus, image data, position information, and imaging time are included in the image file. The time may be obtained from a built-in clock of the imaging apparatus 100 and may also be obtained from a radio wave which the positioning unit 110 has received for positioning.

In step S505, the imaging apparatus 100 records the data for image file generated in step S504 in the storage medium 106. In step S506, the imaging apparatus 100 records the position information and the imaging time, which have been used in step S504, in the route log file in the storage medium 106. Normally, the route log file is recorded at a regular interval according to processing in steps S508 and S509. In addition to the recording of the position information and the imaging time recording in such steps, since the position information and the imaging time are also recorded in step S506, the position information acquired when the imaging has been performed can be added to the route log file. This recording is additional writing. In other words, the additional writing of the position and time is repeated, so that a locus record is recorded in the route log file. The format of the data structure of the route log file is not limited so long as a position and time at each point of time can be referenced.

In step S507, the imaging apparatus 100 determines whether a predetermined time has elapsed since the last recording of the route log in step S508 and step S509. If a predetermined time has elapsed from the recording (YES in step S507), the processing proceeds to step S508. Further, if this recording is the first recording of the position information, the processing also proceeds to step S508. On the other hand, if a predetermined time has not yet elapsed since the last recording (NO in step S507), the processing proceeds to step S510. In step S508, the imaging apparatus 100 drives the positioning unit 110 and acquires the current position. In step S509, the imaging apparatus 100 records the position information acquired in step S508 and the current time in the route log in the file storage medium 106.

In step S510, the imaging apparatus 100 determines whether a user has designated the display of the route log by operating the operating unit 108. If the display of the route log has been designated by the user (YES in step S510), the processing proceeds to step S511. If not (NO in step S510), the processing returns to step S501.

In step S511, the imaging apparatus 100 displays the route log on the display unit 107. This route log has been interpolated with the information of the imaging position according to the processing in step S506. Although the processing in step S511 is realized by the CPU 103 reading out the route log file, after the route log file is transferred to the external apparatus, the route log can be displayed by the external apparatus.

By executing the processing described above, the accuracy of the route log can be improved according to the interpolation of route log with the position information recorded at the time of imaging. In other words, although the normal route log is formed by position information acquired at regular intervals, the imaging position information is added to the normal route log according to the present exemplary embodiment. Especially, the position where the imaging has been performed is likely to be an important position for the user. Thus, the interpolation with the information of the imaging position is considered to be effective. Further, since the route log is interpolated at the time the imaging has been performed, even if the images are deleted at a later time, the position information is used for the interpolation of the route log.

The present invention can also be realized by supplying a storage medium storing a software program code which realizes a function of the above-described embodiments to an apparatus or a system. Thus, the scope of the above-described embodiments can be also achieved when the apparatus or the system reads and executes the program code stored in such a computer-readable storage medium. In this case, the program code itself read out from the storage medium realizes the functions described in the above-described embodiments. Thus, the storage medium which stores the program code constitutes the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-025002 filed Feb. 8, 2011, which is hereby incorporated by reference herein in its entirety.

What is claimed is:

1. An imaging apparatus comprising:
   an imaging unit configured to perform imaging of an object and obtain image data;
   a first recording unit configured to acquire position information at regular intervals and record the position information in a single route log file;
   a second recording unit configured to, in a case that imaging is performed, acquire imaging-related position information and record the acquired imaging-related position information in such a manner that the acquired imaging-related position information is correlated with the image data obtained by the imaging unit;
   a receiving unit configured to receive an instruction for deleting image data;
   an extraction unit configured to, triggered by the receiving unit receiving the instruction for deleting the image data, extract the position information correlated with the image data instructed to be deleted; and
   a third recording unit configured to record the position information extracted by the extraction unit, to retain the correlation between the time the image to be deleted was obtained and the extracted position information after subsequent deletion of the image.

2. The apparatus according to claim 1, wherein the third recording unit is configured to record the position information extracted by the extraction unit in a file, which is different from the route log file.

3. The apparatus according to claim 1, wherein the first recording unit is configured to record the position information extracted by the extraction unit in the route log file.

4. The apparatus according to claim 3,
   wherein the first recording unit is configured to record a time when the position information has been acquired, together with the position information acquired at regular intervals in the route log file,
   wherein the second recording unit is configured to record a time when the position information has been acquired, together with the position information, in such a manner that the acquisition time together with the acquired position information is correlated with the image data obtained by the imaging unit, and,
   wherein the first recording unit is configured to record the position information extracted by the extraction unit in the route log file based on the time recorded in the route log file and the time recorded in correlation with the image data.

5. The apparatus according to claim 1, wherein the first recording unit is configured to convert the position information extracted by the extraction unit into a format which can be used in the route log file and record the position information in the route log file.

6. The apparatus according to claim 1, further comprising a display unit configured to display a route log based on the route log file in which the position information extracted by the extraction unit is recorded.

7. The apparatus according to claim 1, further comprising a transmission unit configured to transmit the route log file in which the position information extracted by the extraction unit is recorded to an external apparatus.

8. The apparatus according to claim 1, wherein the position information is configured to be received from a global positioning system (GPS) satellite.

9. A system including an imaging apparatus and an information processing apparatus, the system comprising:
   an imaging unit configured to perform imaging of an object and obtain image data;
   a first recording unit configured to acquire position information at regular intervals and record the position information in a single route log file;
   a second recording unit configured to, in a case that imaging is performed by the imaging unit, acquire imaging-related position information and record the acquired imaging-related position information in such a manner that the acquired imaging-related position information is correlated with the image data obtained by the imaging unit;
   a receiving unit configured to receive an instruction for deleting image data;
   an extraction unit configured to, triggered by the receiving unit receiving the instruction for deleting the image data and prior to the instructed deletion of image data, extract the position information correlated with the image data instructed to be deleted;
   a third recording unit configured to record the position information extracted by the extraction unit to retain the correlation between the time the image to be deleted was obtained and the extracted position information after subsequent deletion of the image; and
   a fourth recording unit configured to record the position information extracted by the extraction unit in the route log file.

10. The system according to claim 9, wherein the first recording unit is configured to record a time when the position information has been acquired, together with the position information acquired at regular intervals in the route log file;
   wherein the second recording unit is configured to record a time when the position information has been acquired, together with the position information, in such a manner that the acquisition time together with the acquired position information is correlated with the image data obtained by the imaging unit, and,
   wherein the fourth recording unit is configured to record the position information extracted by the extraction unit in the route log file based on the time recorded in the route log file and the time recorded in correlation with the image data.

11. The system according to claim 9, wherein the fourth recording unit is configured to convert the position information extracted by the extraction unit into a format which can be used in the route log file and record the position information in the route log file.

12. The apparatus according to claim 9, further comprising a display unit configured to display a route log based on the route log file recorded by the fourth recording unit.

13. The apparatus according to claim 1, further comprising a transmission unit configured to transmit the route log file, in which the position information extracted by the extraction unit is recorded, from the imaging apparatus to the information processing apparatus.

14. A control method of an imaging apparatus, the method comprising:
   imaging an object to obtain image data;
   acquiring position information at regular intervals and recording the position information in a single route log file;
   in a case that imaging is performed, acquiring imaging-related position information and recording the acquired imaging-related position information in such a manner that the acquired imaging-related position information is correlated with the image data;
   in a case that an instruction for deleting image data is received, extracting the position information correlated with the image data instructed to be deleted before the image data is deleted; and
   recording the extracted position information to retain the correlation between the time the image to be deleted was obtained and the extracted position information after deletion of the image.

15. A non-transitory computer-readable recording medium recording a program for causing a computer to execute the method of claim 14.

16. A control method of a system including an imaging apparatus and an information processing apparatus, the method comprising:
   imaging an object to obtain image data;
   acquiring position information at regular intervals and recording the position information in a single route log file;
   in a case that imaging is performed, acquiring imaging-related position information and recording the acquired imaging-related position information in such a manner that the acquired imaging-related position information is correlated with the image data;
   in a case that an instruction is received for deleting image data, extracting the position information correlated with the image data instructed to be deleted before the image data is deleted so as to retain the position information; and
   recording the extracted position information in the route log file to retain the extracted position information of the instructed to be deleted image, and its correlation with the time the image to be deleted was obtained, after deletion of the image.

17. A non-transitory computer-readable recording medium recording a program for causing a computer to execute the method of claim 16.

18. The apparatus according to claim 1, wherein the extraction unit extracts the position information correlated with the image data instructed to be deleted before the image data is deleted.

* * * * *